(12) United States Patent
Kim et al.

(10) Patent No.: US 7,415,451 B2
(45) Date of Patent: Aug. 19, 2008

(54) CYCLE REFERENCING MANAGEMENT METHOD AND APPARATUS, PARSING METHOD AND APPARATUS, AND RECORDING MEDIUM STORING A PROGRAM TO IMPLEMENT THE SAME

(75) Inventors: Du-il Kim, Suwon-si (KR); Seong-kook Shin, Seoul (KR); Young-yoon Kim, Seoul (KR); Jin-yong Ahn, Suwon-si (KR); Hee-yeon Kim, Suwon-si (KR); Hyok-sung Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 11/097,240

(22) Filed: Apr. 4, 2005

(65) Prior Publication Data

US 2005/0223036 A1 Oct. 6, 2005

Related U.S. Application Data

(60) Provisional application No. 60/558,549, filed on Apr. 2, 2004.

(30) Foreign Application Priority Data

May 24, 2004 (KR) ...................... 10-2004-0036951

(51) Int. Cl.
 *G06F 7/00* (2006.01)

(52) U.S. Cl. ......................................................... 707/1
(58) Field of Classification Search ...................... 707/1
 See application file for complete search history.

(56) References Cited

U.S. PATENT DOCUMENTS

| 4,947,320 | A | | 8/1990 | Crus et al. | |
|---|---|---|---|---|---|
| 5,754,535 | A | * | 5/1998 | Vandenabeele et al. | 370/321 |
| 6,415,301 | B1 | * | 7/2002 | Takahashi | 707/205 |
| 2004/0156426 | A1 | * | 8/2004 | Motoyoshi et al. | 375/150 |

FOREIGN PATENT DOCUMENTS

| KR | 10-0362978 B1 | 11/2002 |
|---|---|---|
| KR | 10-2004-0105363 A | 12/2004 |

* cited by examiner

*Primary Examiner*—Chong H Kim
(74) *Attorney, Agent, or Firm*—Sughrue Mion, PLLC

(57) ABSTRACT

A cyclic referencing management method and apparatus, a parsing method and apparatus, and a computer readable recording medium storing a program to implement the methods are provided. The method for managing cyclic referencing that may occur by mutual references of assets in a file provided to control assets in a multimedia application environment, includes: detecting an asset generating cyclic referencing; and ignoring the asset generating cycling referencing. According to the methods and apparatuses, cyclic referencing that can occur in a file to control assets can be detected and processed such that the system can be prevented from entering an indefinite loop or causing an erroneous operation.

19 Claims, 12 Drawing Sheets

FIG. 4A (PRIOR ART)

```xml
<?xml version="1.0" encoding="UTF-8"?>
<file:Manifest
    xmlns:file="http://ns.osta.org/manifest/1.0/"
    xmlns:mpv="http://ns.osta.org/mpv/1.0/">
  <nmf:Metadata>
    <file:ManifestProperties>
      <file:ProfileBag>
        <file:Profile>http://ns.osta.org/mpv/basic/1.0/</file:Profile>
      </file:ProfileBag>
    </file:ProfileBag>
  </nmf:Metadata>
  <mpv:AssetList>
    <mpv:Seq mpv:id="seq001">
      <mpv:AudioRef mpv:idRef="audio001"/>
      <mpv:StillRef mpv:idRef="still001"/>
      <mpv:AudioRef mpv:idRef="audio002"/>
      <mpv:StillWithAudioRef mpv:idRef="sa001"/>
      <mpv:StillRef mpv:idRef="still002"/>
      <mpv:StillRef mpv:idRef="still003"/>
    </mpv:Seq>
    <mpv:Still mpv:id="still001">
      <mpv:LastURL>images/still01.jpg</mpv:LastURL>
    </mpv:Still>
    <mpv:Still mpv:id="still002">
      <mpv:LastURL>images/still02.jpg</mpv:LastURL>
    </mpv:Still>
    <mpv:Still mpv:id="still003">
      <mpv:LastURL>images/still03.jpg</mpv:LastURL>
    </mpv:Still>
    <mpv:Still mpv:id="still004">
      <mpv:LastURL>images/still04.jpg</mpv:LastURL>
    </mpv:Still>
    <mpv:StillWithAudio mpv:id="sa001">
      <mpv:StillRef mpv:idRef="still104">
      <mpv:AudioRef mpv:idRef="audio03">
    </mpv:StillWithAudio>
    <mpv:Audio mpv:id="audio001">
      <mpv:LastURL>audios/audio01.mp3</mpv:LastURL>
    </mpv:Audio>
    <mpv:Audio mpv:id="audio002">
      <mpv:LastURL>audios/audio02.mp3</mpv:LastURL>
    </mpv:Audio>
    <mpv:Audio mpv:id="audio003">
      <mpv:LastURL>audios/audio03.mp3</mpv:LastURL>
    </mpv:Audio>
  </mpv:AssetList>
</file:Manifest>
```

FIG. 5A (PRIOR ART)

```xml
<?xml version="1.0" encoding="UTF-8"?>

<file:Manifest
  xmlns:file="http://ns.osta.org/manifest/1.0/"
  xmlns:mpv="http://ns.osta.org/mpv/1.0/">
  <nmf:Metadata>
    <file:ManifestProperties>
      <file:ProfileBag>
        <file:Profile>http://ns.osta.org/mpv/basic/1.0/</file:Profile>
      </file:ProfileBag>
    </file:ProfileBag>
  </nmf:Metadata>
  <mpv:AssetList>
    <mpv:Seq mpv:id="seq001">                                   ── 51
      <mpv:SeqRef mpv:id="seq002"/>
    </mpv:Seq>

<mpv:Seq mpv:id="seq002">
      <mpv:StillRef mpv:idRef="still001"/>                      ── 52
      <mpv:SeqRef mpv:id="seq003"/>
    </mpv:Seq>

<mpv:Seq mpv:id="seq003">
      <mpv:StillRef mpv:idRef="still002"/>                      ── 53
    </mpv:Seq>

<mpv:Still mpv:id="still001">
      <mpv:LastURL>images/still01.jpg</mpv:LastURL>             ── 54
    </mpv:Still>

<mpv:Still mpv:id="still002">
      <mpv:LastURL>images/still02.jpg</mpv:LastURL>             ── 55
    </mpv:Still>
  </mpv:AssetList>
</file:Manifest>
```

FIG. 6A (PRIOR ART)

```
<?xml version="1.0" encoding="UTF-8"?>

<file:Manifest
  xmlns:file="http://ns.osta.org/manifest/1.0/"
  xmlns:mpv="http://ns.osta.org/mpv/1.0/">
  <nmf:Metadata>
    <file:ManifestProperties>
      <file:ProfileBag>
        <file:Profile>http://ns.osta.org/mpv/basic/1.0/</file:Profile>
      </file:ProfileBag>
    </file:ProfileBag>
  </nmf:Metadata>
  <mpv:AssetList>
    <mpv:Seq mpv:id="seq001">                       ─ 61
       <mpv:SeqRef mpv:idRef="seq002"/>
    </mpv:Seq>

<mpv:Seq mpv:id="seq002">                       ─ 62
       <mpv:SeqRef mpv:idRef="seq003"/>
    </mpv:Seq>

<mpv:Seq mpv:id="seq003">                       ─ 63
       <mpv:SeqRef mpv:idRef="seq001"/>
    </mpv:Seq>
  </mpv:AssetList>
</file:Manifest>
```

FIG. 6B (PRIOR ART)

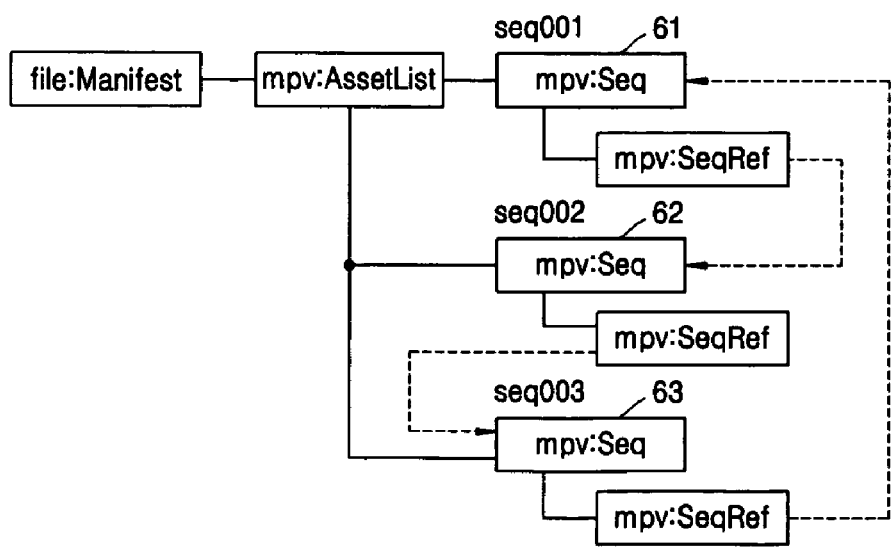

FIG. 7 (PRIOR ART)

```
<?xml version="1.0" encoding="UTF-8"?>
<file:Manifest
  xmlns:file="http://ns.osta.org/manifest/1.0/"
  xmlns:mpv="http://ns.osta.org/mpv/1.0/"
  xmlns:mpvp="http://ns.osta.org/mpv/presentation/1.0/"
  xmlns:mpvm="http://ns.osta.org/mpv/music/1.0/"
  xmlns:nmf="http://ns.osta.org/nmf/1.0/"
  xmlns:dc="http://ns.osta.org/nmf/1.0/dc/">
  <nmf:Metadata>
    <file:ManifestProperties>
      <file:ProfileBag>
        <file:Profile>http://ns.osta.org/mpv/basic/1.0/</file:Profile>
      </file:ProfileBag>
    </file:ProfileBag>
  </nmf:Metadata>
  <mpv:AssetList>
    <mpv:Seq mpv:id="seq0000">
      <mpv:SeqRef mpv:idRef="seq0000"/>
      <mpv:StillRef mpv:idRef="still0000"/>       ─72    ─71
      </mpv:Seq>                                  ─73

<mpv:Still mpv:id="still0000">
      <mpv:LastURL>a.jpg</mpv:LastURL>
    </mpv:Still>
  </mpv:AssetList>
</file:Manifest>
```

CYCLE REFERENCING MANAGEMENT METHOD AND APPARATUS, PARSING METHOD AND APPARATUS, AND RECORDING MEDIUM STORING A PROGRAM TO IMPLEMENT THE SAME

This application claims the priority of U.S. Provisional Application No. 60/558,549, filed on Apr. 2, 2004, in the United States Patent Trademark Office, and Korean Patent Application No. 2004-36951, filed on May 24, 2004, in the Korean Intellectual Property Office, the disclosures of which are incorporated herein in their entirety by reference.

BACKGROUND OF THE INVENTION

1. Field of the Invention

The present invention relates to controlling assets such as digital content in a multimedia application environment, and more particularly, to a cyclic referencing management method and apparatus, a parsing method and apparatus, and a computer readable recording medium storing a program to implement the methods.

2. Description of the Related Art

Recently, media such as digital still images, video, digital audio, and text have been processed and reproduced by using a personal computer (PC). Also, as apparatuses generating these media, for example, digital cameras, digital camcorders, digital audio players (MP3, WMA), are increasingly widely used, a variety of types of digital content are massively generated.

However, in order to manage the content, that is, multimedia data, which are massively generated, file based experiences are requested to users, and if thus managed data, to which attributes, such as a data reproduction order or method, are given, is reproduced in an apparatus other than a PC, the attribute data given in the PC is lost and only original data is transferred. That is, interoperability of data and data attributes among consumer electronic products, PCs, and digital content generating apparatuses is very weak at present. Examples of weakness of interoperability will now be explained.

FIG. 1 is a reference diagram explaining the concept of MusicPhotoVideo (MPV) according to a conventional technology.

Referring to FIG. 1, by using a digital camera 10, a photo or video clip is generated, the generated photo or video clip is moved to a PC 11, works such as edition are performed, and the worked content are burned on an optical recording medium such as a CD-R/Video-CD, and a DVD-R/+R. The thus burned optical recording medium can reproduce the content in a DVD player 12 or a TV 13.

Also, the content worked in the PC can be transferred to a printer 14 to be printed, and to an online medium 15.

Thus, by using a digital camera, a photo is captured, and attribute data, such as a slide show order or a time interval between photos determined when a slide show function is used to confirm the capture photos in the digital camera, or relations between the captured photos determined when a panorama function is used, is stored together with the original data. If this digital camera is connected to a TV through an audio/video (AV) cable and an image is transmitted to the TV, content with each attribute expressed can be viewed by a user. However, if the digital camera is connected to a PC through a universal serial bus (USB) cable, only the original data is transmitted to the computer and all the attached attributes are lost.

This is because the digital camera and the PC have information structures different to each other. As shown in the above example, the attribute data stored in the digital camera, that is, metadata, has no interoperability with the PC. In order to compensate these data between digital apparatuses for weak interoperability, a standard referred to as MusicPhoto-Video (MPV) has been being prepared. That is, the MPV is a standard to further ease expression, exchange, processing, and reproduction of metadata such as digital music, photo, and video in consumer electronics (CE) apparatuses and IT apparatuses. The MPV standard, which is currently being prepared by Optical Storage Technology Association (OSTA), defines manifest, metadata, and practice to process and reproduce sets of content, such as digital photos, video, and audio, stored in a storage medium such as an optical disk, a memory card, a computer hard disk, or exchanged according to Internet protocols. The manifest is an independent extensible markup language (XML) document file and is obtained by grouping all MPV elements.

The MPV is generally broken down into two parts: MPV core specification (MPV Core-Spec.) and Profile. The MPV Core includes three basic elements: collection, metadata, and identifier. The collection includes a manifest as a root member, an album, marked assets (MarkedAsset), and an asset list (AssetList). An asset is a basic unit of content processed by the MPV and there are two types of assets: a simple media asset such as digital photos, video, digital audio, and documents, etc., and a composite media asset such as digital photos+digital audio, digital still multi-shot sequences, digital still panorama sequences, etc. Based on the content recorded in an MPV file having this structure, MPV software controls such that an asset is read and reproduced. That is, the MPV file is placed between MPV software and data referred to as an asset, and plays a linking role. Accordingly, the MPV file can be regarded as a file system in a higher level operating similarly to the conventional file system.

The asset that is a basic unit of content processed in the MPV will now be explained in more detail with reference to FIGS. 2 and 3.

FIG. 2 is a diagram showing an example of MPV simple assets according to the conventional technology. Simple assets correspond to physical storage entities. As simple assets, there are a still 21, a video 22, an audio 23, a text 24, a print 25, a document 26, and a manifest link (ManifestLink) 27.

FIG. 3 is a diagram showing an example of MPV composite assets according to the conventional technology. Composite assets are meaningful groups of media assets. These composite assets correspond to ordinary capture modes of a digital camera.

As composite assets, there are a still with audio (StillWithAudio) 31, a still multi-shot sequence (StillMultishotSequence) 32, a still panorama sequence (StillPanoramaSequence) 33, a Par 34, and a Seq 35.

Among these, the Par 34 or Seq 35 permits arbitrary expression of media assets different to each other in types. That is, while other composite assets are fixed in that simple assets contained in respective composite assets are predefined, simple assets contained in the Par or Seq are not fixed such that simple assets can be arbitrarily combined.

The Par defines a composite asset when a set of assets are generated in synchronization with each other. Referring to FIG. 3, it can be seen that Par 34 is formed with a group of assets, which are arranged to be parallel. The Seq defines a composite asset when a set of assets are generated in a predetermined order. Referring to FIG. 3, it can be seen that Seq 35 is formed with a group of assets, which are arranged in a predetermined order.

The usage of the Seq will now be explained.

FIG. 4A is an example of an MPV file explaining a usage example of <mpv:Seq> according to the conventional technology.

Referring to FIG. 4A, it can be seen that a manifest 1 is at the top level that is the largest in an MPV file, and an asset list 40 is at a level immediately below the top level.

Then, the lower levels of the asset list 40 include <mpv:Seq> 41 whose identifier (mpv:id) is "seq001", <mpv:Still> 42 whose identifier is "still001", <mpv:Still> 43 whose identifier is "still002", <mpv:Still> 44 whose identifier is "still003", <mpv:Still> 45 whose identifier is "still004", <mpv:StillWithAudio> 46 whose identifier is "sa001", <mpv:Audio> 47 whose identifier is "audio001", <mpv:Audio> 48 whose identifier is "audio002", and <mpv:Audio> 49 whose identifier is "audio003".

Thus, the assets 41 through 49 at the levels lower than the asset list 40 are child assets of the asset list 40, and reversely, the asset list 40 is the parent asset of the child assets 41 through 49.

Among these child assets, <mpv:Seq> 41 and <mpv:StillWithAudio> 46 are composite assets and the remaining assets, <mpv:Still> and <mpv:Audio>, are simple assets.

Simple assets each have a LastURL indicating the location of content for referencing the asset. For example, a still asset whose identifier (ID) is "still001" expresses "images/still01.jpg", as the LastURL indicating the location of still001 content.

In the composite assets, <mpv:Seq> 41 internally has 6 child assets.

That is, it can be seen that the first child asset of <mpv:Seq>41 refers to an audio whose ID is "audio001". The second child asset refers to a still whose ID is "still001", the third child asset refers to an audio whose ID is "audio002", the fourth child asset refers to a StillWithAudio whose ID is "sa001", the fifth child asset refers to a still whose ID is "still002", and the sixth child asset refers to a still whose ID is "still003".

In the composite assets, the StillWithAudio 46 internally has 2 child assets.

The first child asset refers to a still whose ID is "still004", and the second child asset refers to an audio whose ID is "audio003".

In the composite assets as described above, it can be seen that the StillWithAudio has only a still and an audio as assets, as shown in its name, while <mpv:Seq> can have any assets as its child assets.

Thus, <mpv:Seq> can have any type of reference assets with an ending of Ref, as in, for example, mpv:StillRef, and mpv:AudioRef. Accordingly, it is very complex to extract information from this asset. For example, in order to obtain actual information of <mpv:Still> embedded in <mpv:StillWithAudioRef> assigned by <mpv:Seq>, the following steps are required:

1. In order to obtain <mpv:StillWithAudioRef> whose mpv:idRef is "sa001", parsing <mpv:Seq> whose mpv:id is "seq001" is performed, 2. in order to obtain <mpv:StillRef>, parsing <mpv:StillWithAudio> whose mpv:id is "sa001" is performed, and 3. mpv:idRef attribute of <mpv:StillRef> in <mpv:StillWithAudio> is obtained and <mpv:Still> whose mpv:id is "still004" is found.

FIG. 4B is a diagram of a tree structure explaining the structure of the MPV file shown in FIG. 4A.

Referring to FIG. 4B, an AssetList 40 is below a manifest 1, and 9 child assets 41 through 49 are below the AssetList 40.

Each child asset of <mpv:Seq> 41 refers to a child asset of the AssetList 40.

This structure is an ordinary form of using <mpv:Seq> that is a composite asset.

FIG. 5A is an example of an MPV file explaining another usage example of <mpv:Seq> according to the conventional technology.

Referring to FIG. 5A, an AssetList has 5 child assets.

The first child asset 51 is <mpv:Seq> whose ID is "seq001" and which has a child asset referring to an asset whose ID is "seq002".

The second child asset 52 is <mpv:Seq> whose ID is "seq002" and which has a child asset referring to an asset whose ID is "still001", and a child asset referring to an asset whose ID is "seq003".

The third child asset 53 is <mpv:Seq> whose ID is "seq003" and which has a child asset referring to an asset whose ID is "still002".

The fourth child asset 54 is a still asset whose ID is "still001".

The fifth child asset 55 is a still asset whose ID is "still002".

FIG. 5B is a diagram of a tree structure explaining the structure of the MPV file shown in FIG. 5A.

Referring to FIG. 5B, <mpv:Seq> 51 that is the first child asset of the AssetList refers to <mpv:Seq> 52 that is the second child asset, and <mpv:Seq> 52 that is the second child asset refers to <mpv:Seq> 53 that is the third child asset. Also, <mpv:Seq> 53 that is the third child asset refers to "still002" that is a simple asset.

Though <mpv:Seq> continuously refers to another <mpv:Seq>, an asset that is finally referred to is "still002" that is a simple asset. Accordingly, a problem such as cyclic reference does not occur.

Thus, it can be seen that a composite asset like <mpv:Seq> or <mpv:Par> is made to have a plurality of primary assets as children. Though this composite structure of a composite asset has an advantage that a greater variety of reproduction scenarios can be implemented, there may occur a variety of problems due to many children. One of these problems is "cyclic referencing", which will now be explained with reference to FIGS. 6A and 6B.

FIG. 6A is an example of an MPV file explaining a case where cyclic referencing occurs due to use of <mpv:Seq> according to the conventional technology.

Referring to FIG. 6A, an AssetList has 3 child assets that are all <mpv:Seq>.

The first child asset 61 is <mpv:Seq> whose ID is "seq001", and refers to an asset whose ID is "seq002".

The second child asset 62 is <mpv:Seq> whose ID is "seq002" and refers to an asset whose ID is "seq003".

The third child asset 63 is <mpv:Seq> whose ID is "seq003" and refers to an asset whose ID is "seq001".

In this situation, a cyclic referencing problem occurs. That is, since the third child asset from the top again refers to the first child asset, these 3 child assets are entering an infinite loop.

FIG. 6B is a diagram of a tree structure explaining the structure of the MPV file shown in FIG. 6A.

Referring to FIG. 6B, child asset seq001 61 refers to child asset seq002 62, child asset seq002 62 refers to child asset seq003 63, and child asset seq003 63 refers to child asset seq001 61. Accordingly, it can be seen that a loop is generated among seq001, seq002, and seq003, which generates a cyclic referencing problem in which getting out of the loop is impossible.

FIG. 7 is another example of an MPV file explaining a case where cyclic referencing occurs due to use of <mpv:Seq> according to the conventional technology.

Referring to FIG. 7, an AssetList has a child asset, <mpv: Seq> 71, whose ID is "seq0000". The child asset 71 has a child asset, <mpv:SeqRef>, which refers to an asset whose ID is "seq0000". Since the parent asset 71 and the child asset 72 refer to each other, an infinite loop occurs between the two and the system may operate as if it halts. Accordingly, a cyclic referencing problem occurs.

However, in the conventional technology, if a cyclic referencing problem occurs while an MPV parser parses an MPV file, the parser reports to the application that the MPV data is incorrect, or the system operates incorrectly as if it halts. Accordingly, data contained in the MPV file cannot be used any more.

SUMMARY OF THE INVENTION

The present invention provides a cyclic referencing management method and apparatus, and a parsing method and apparatus, by which even when cyclic referencing occurs in an MPV file, a system can be operated normally and data contained in the MPV file can be used, and a computer readable recording medium storing a program implementing the methods.

According to an aspect of the present invention, there is provided a cyclic referencing management method for managing cyclic referencing occurring by mutual references of assets in a file provided to control assets in a multimedia application environment, the method including: detecting an asset generating cyclic referencing; and ignoring the asset generating cycling referencing.

The asset generating the cyclic referencing may include <mpv:Seq> or <mpv:Par>.

According to another aspect of the present invention, there is provided a cyclic referencing management method for managing cyclic referencing occurring by mutual references of assets in a file provided to control assets in a multimedia application environment, the method including: detecting an asset capable of generating cyclic referencing; detecting a child asset referring to the detected asset, among child assets of the detected asset; and ignoring the detected child asset.

Detecting the child asset referring to the detected asset, among child assets of the detected asset includes: comparing mpv:id that is the identifier of the detected asset, with mpv: idRef that is a reference identifier of the child asset referring to another asset, among the child assets of the asset; and detecting a child asset having mpv:idRef identical to the mpv:id.

According to still another aspect of the present invention, there is provided a parsing method for parsing a file provided to control assets in a multimedia application environment, the method including: determining whether or not the file complies with an extensible markup language (XML) file rule and a MusicPhotoVideo (MPV) file rule; parsing the entire assets contained in the file if the file complies with the XML file rule and MPV file rule; detecting an asset generating cyclic referencing while parsing the asset; and ignoring the asset generating the cyclic referencing.

According to yet still another aspect of the present invention, there is provided a cyclic referencing management apparatus for managing cyclic referencing occurring by mutual references of assets in a file provided to control assets in a multimedia application environment, the apparatus including: a cyclic referencing management unit which detects an asset generating cyclic referencing and ignores the asset generating cycling referencing.

The asset generating the cyclic referencing may include <mpv:Seq> or <mpv:Par>.

According to a further aspect of the present invention, there is provided a cyclic referencing management apparatus for managing cyclic referencing occurring by mutual references of assets in a file provided to control assets in a multimedia application environment, the apparatus including: a detection unit which detects an asset capable of generating cyclic referencing; an identifier storage unit which stores the identifier of the detected asset; an identifier comparison unit which detects a child asset referring to the asset having the stored identifier, among child assets of the detected asset; and a cyclic referencing processing unit which ignores the detected child asset.

The identifier comparison unit may compare mpv:id that is the identifier of the stored asset, with mpv:idRef that is a reference identifier of the child asset referring to another asset, among the child assets of the asset, and detect a child asset having mpv:idRef identical to the mpv:id.

According to an additional aspect of the present invention, there is provided a parsing apparatus for parsing a file provided to control assets in a multimedia application environment, the apparatus including: a cyclic referencing management unit which detects an asset generating cyclic referencing while parsing an asset contained in an MPV file complying with an XML file rule and an MPV file rule, and ignores the asset generating the cyclic referencing.

The cyclic referencing management unit may generate reproduction control information to prohibit reproduction of the asset generating the cyclic referencing, and transmit the generated reproduction control information to an apparatus for controlling reproduction of the asset contained in the MPV file.

According to an additional aspect of the present invention, there is provided a computer readable recording medium having embodied thereon a computer program for a cyclic referencing management method for managing cyclic referencing occurring by mutual references of assets in a file provided to control assets in a multimedia application environment, wherein the method includes: detecting an asset generating cyclic referencing; and ignoring the asset generating cycling referencing.

According to an additional aspect of the present invention, there is provided a computer readable recording medium having embodied thereon a computer program for a cyclic referencing management method for managing cyclic referencing occurring by mutual references of assets in a file provided to control assets in a multimedia application environment, wherein the method includes: detecting an asset capable of generating cyclic referencing; storing the identifier of the detected asset; detecting a child asset referring to the asset having the stored identifier, among child assets of the detected asset; and ignoring the detected child asset.

According to an additional aspect of the present invention, there is provided a computer readable recording medium having embodied thereon a computer program for a parsing method for parsing a file provided to control assets in a multimedia application environment, wherein the method includes: determining whether or not the file complies with an extensible markup language (XML) file rule and a MusicPhotoVideo (MPV) file rule; parsing the entire assets contained in the file if the file complies with the XML file rule and MPV file rule; detecting an asset generating cyclic referencing while parsing the asset; and ignoring the asset generating the cyclic referencing.

BRIEF DESCRIPTION OF THE DRAWINGS

The above and other features and advantages of the present invention will become more apparent by describing in detail exemplary embodiments thereof with reference to the attached drawings in which:

FIG. 4A is an example of an MPV file explaining a usage example of <mpv:Seq> according to the conventional technology;

FIG. 5A is an example of an MPV file explaining another usage example of <mpv:Seq> according to the conventional technology;

FIG. 6A is an example of an MPV file explaining a case where cyclic referencing occurs due to use of <mpv:Seq> according to the conventional technology;

FIG. 6B is a diagram of a tree structure explaining the structure of an MPV file shown in FIG. 6A;

FIG. 7 is another example of an MPV file explaining a case where cyclic referencing occurs due to use of <mpv:Seq> according to the conventional technology;

DETAILED DESCRIPTION OF THE INVENTION

The present invention will now be described more fully with reference to the accompanying drawings, in which exemplary embodiments of the invention are shown.

In order to solve the cyclic referencing problem, in the present invention, if the occurrence of cyclic referencing in an MPV is detected, the connection of an asset generating the cyclic referencing such that parsing is performed only for assets before the cyclic referencing occurs, and the asset generating the cyclic referencing is ignored such that the asset cannot be reproduced. Thus, by detecting and ignoring the asset generating the cyclic referencing, the system can be prevented from entering an infinite loop and other assets contained in the MPV file can be used.

First, an apparatus to solve cyclic referencing according to the present invention will now be explained with reference to FIG. 8.

Figure 1:
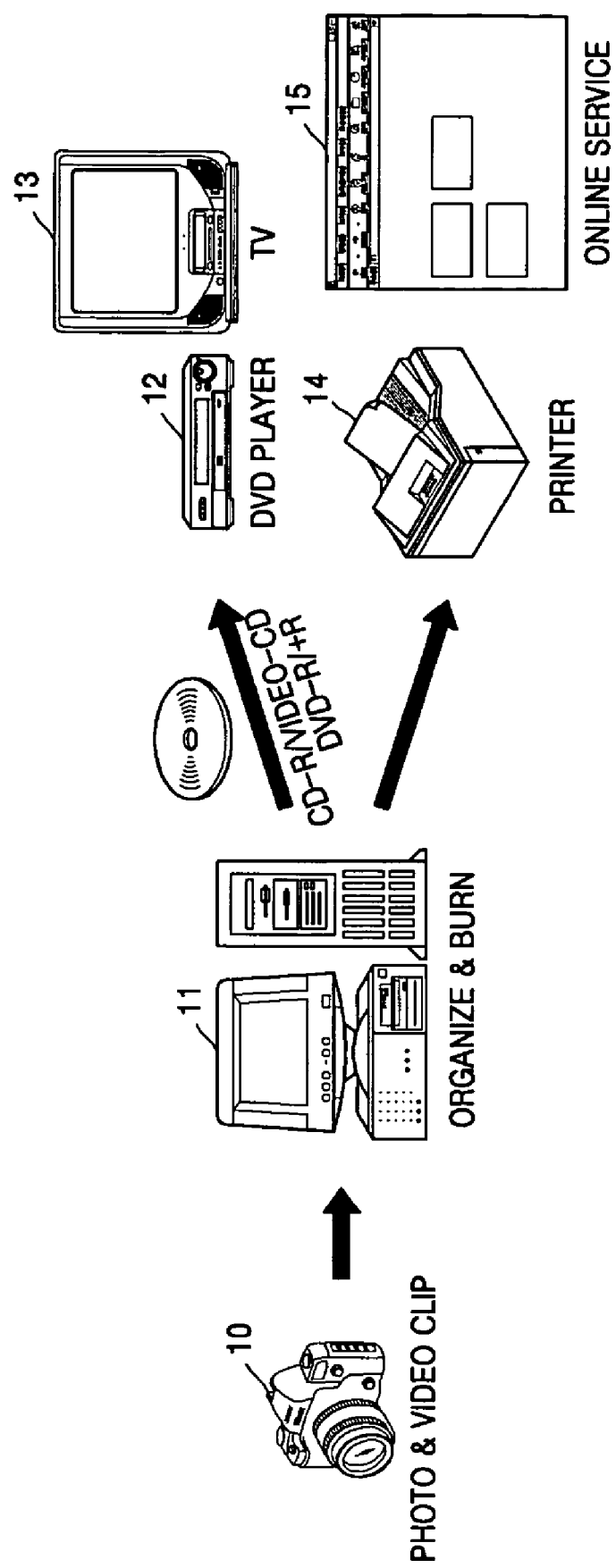
FIG. 1 is a reference diagram explaining the concept of MusicPhotoVideo (MPV) according to a conventional technology.
Figure 2:
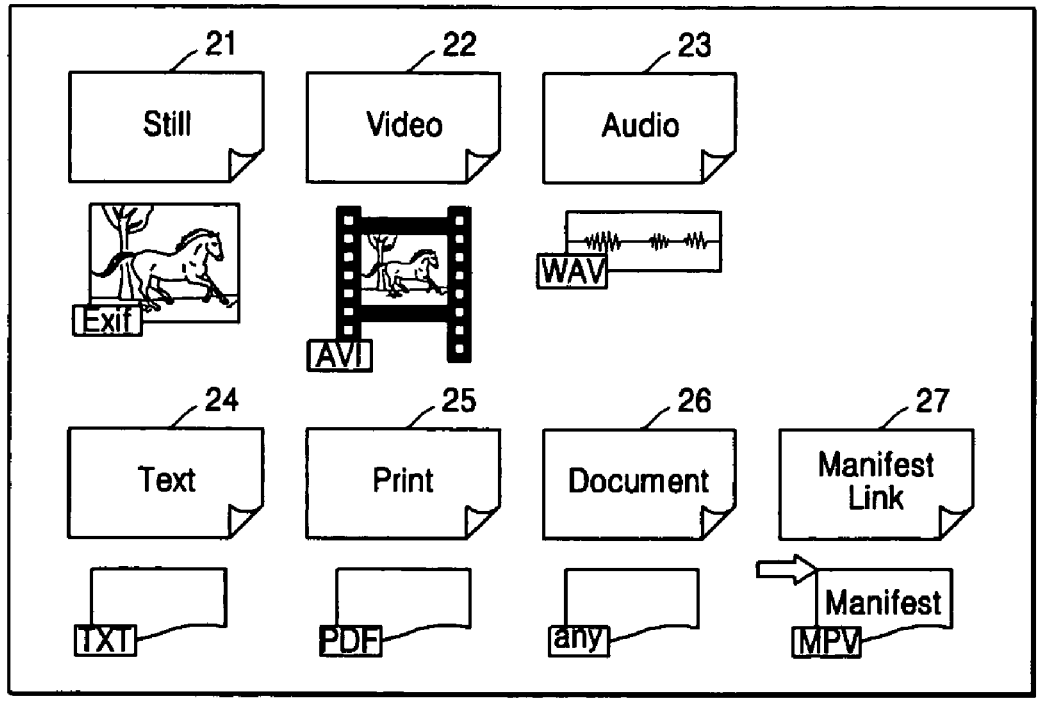
FIG. 2 is a diagram showing an example of MPV simple assets according to the conventional technology.
Figure 3:
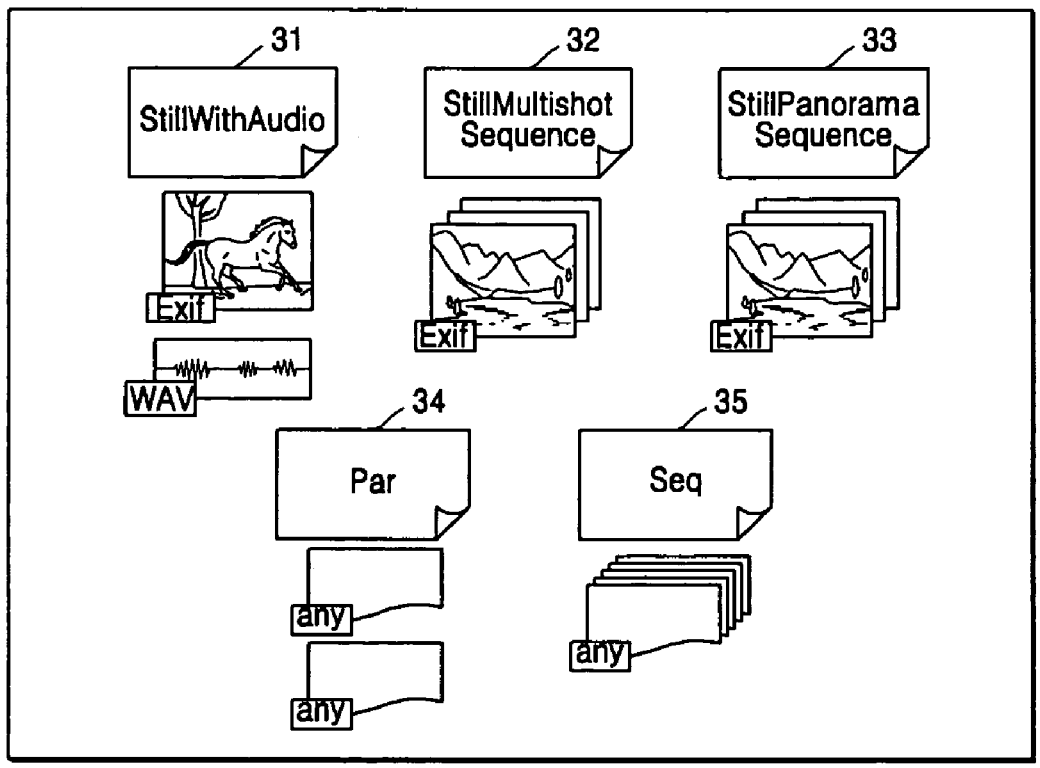
FIG. 3 is a diagram showing an example of MPV composite assets according to the conventional technology.
Figure 4B:
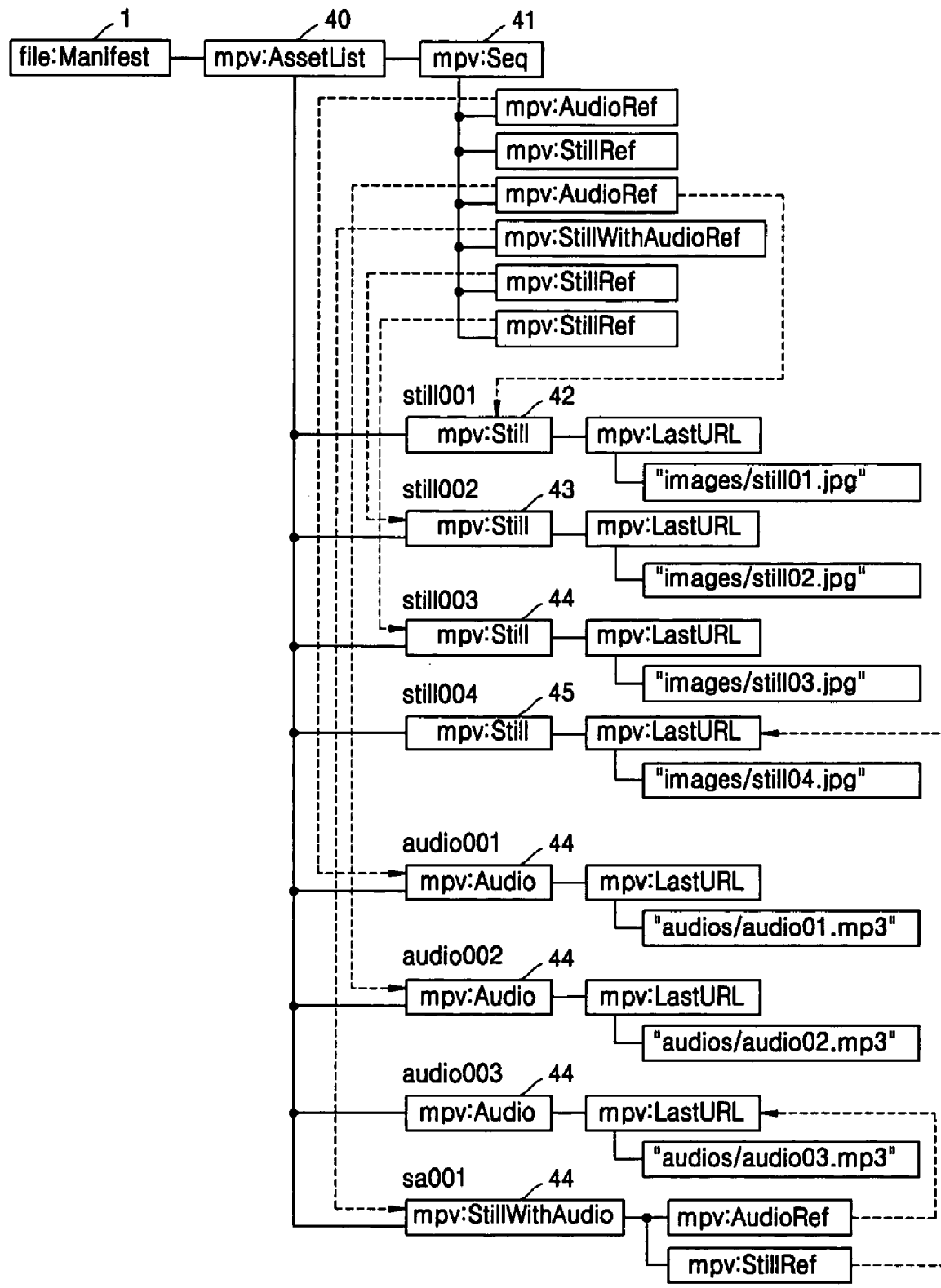
FIG. 4B is a diagram of a tree structure explaining the structure of an MPV file shown in FIG. 4A.
Figure 5B:
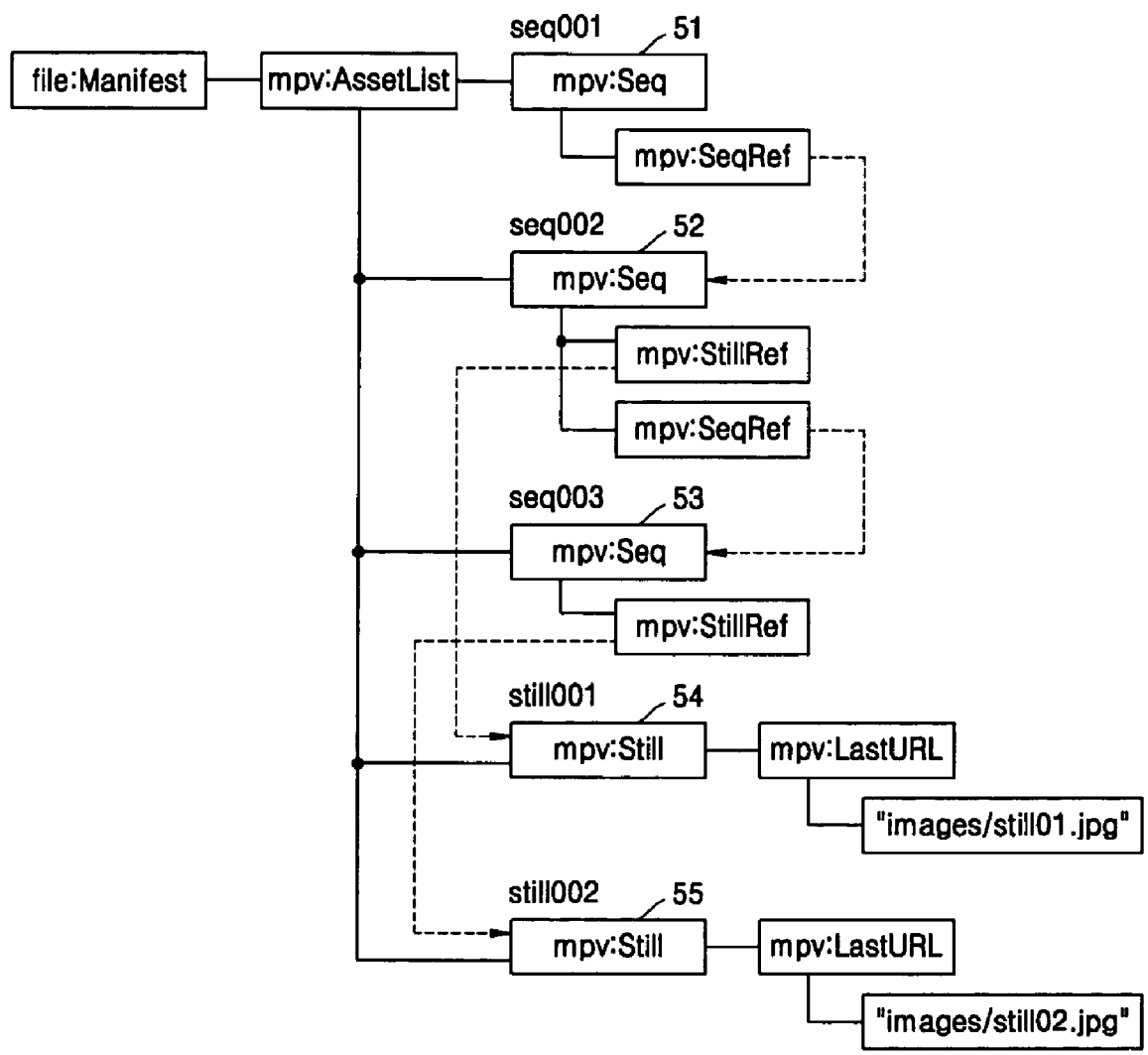
FIG. 5B is a diagram of a tree structure explaining the structure of an MPV file shown in FIG. 5A.
Figure 8:
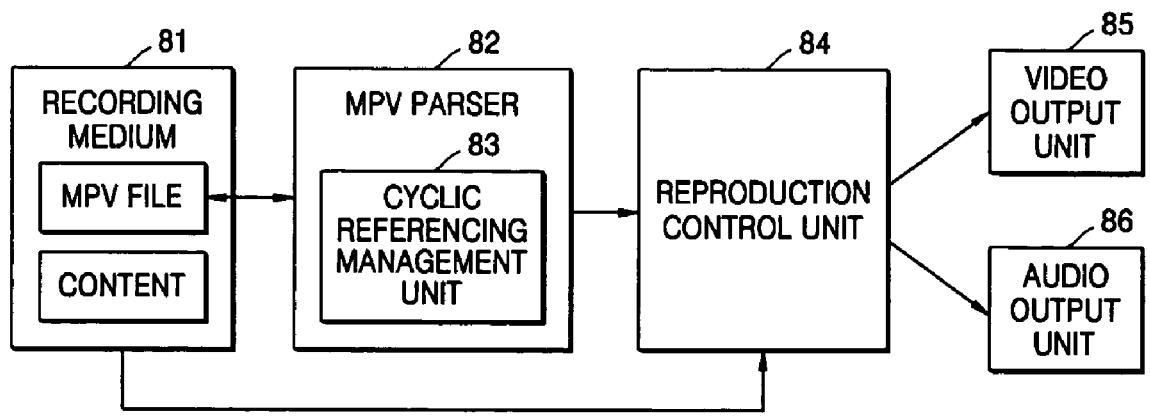
FIG. 8 is a diagram of the entire structure of an apparatus to solve the cyclic referencing according to the present invention.

FIG. 8 is a diagram of the entire structure of an apparatus to solve the cyclic referencing according to the present invention. This apparatus can be applied to content generation products such as a PC, a DVD player, a DVD recorder, an MP3 player, a digital video camera (DVC), and a digital still camera (DSC).

Referring to FIG. 8, the apparatus includes a storage medium 81, an MPV parser 82, a reproduction control unit 84, a video output unit 85, and an audio output unit 86.

The storage medium 81 stores an MPV file to be parsed by the MPV parser 82, and content referred to in the MPV file and reproduced by the reproduction control unit 84. The storage medium 81 can be any one of, for example, a memory, a memory stick, an optical disk, and a hard disk.

The MPV parser 82 reads out an MPV file from the storage medium 81, parses a variety of assets and metadata recorded in the MPV file, and provides reproduction control information that enables reproduction of content stored in the storage medium 81, to the reproduction control unit 84. In particular, MPV parser 82 according to the present embodiment includes a cyclic referencing management unit 83 for resolving a cyclic referencing problem.

The cyclic referencing management unit 83 detects whether or not cyclic referencing occurs while an MPV file is parsed, and if cyclic referencing occurs, performs processing to ignore an asset generating the cyclic referencing. More specifically, here, to ignore means generating reproduction control information such that the asset generating the cyclic referencing cannot be reproduced any more, and providing the generated reproduction control information to the reproduction control unit 84.

If the result of parsing in the MPV parser 82, that is, the reproduction control information, is received, the reproduction control unit 84 controls such that content stored in the storage medium 81 can be reproduced based on the received reproduction control information. At this time, according to the present embodiment, the reproduction control unit 84 controls according to the reproduction control information on the asset generating the cyclic referencing such that the asset generating the cyclic referencing cannot be reproduced.

The video output unit 85 displays content corresponding to an image such as a digital photo provided by the reproduction control unit 84.

The audio output unit 86 outputs an audio signal output from the reproduction control unit 84.

Figure 9:
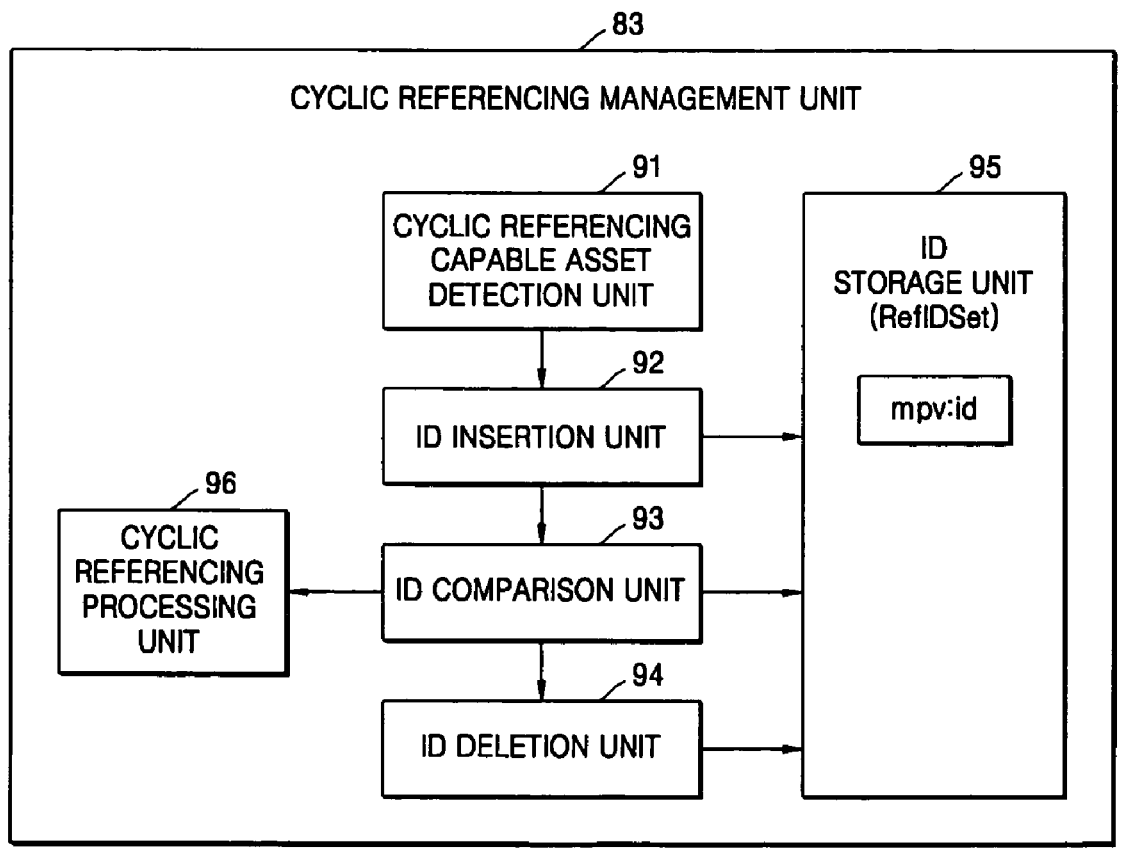
FIG. 9 is a detailed diagram of a cyclic referencing management unit shown in FIG. 8.

FIG. 9 is a detailed diagram of the cyclic referencing management unit 83 shown in FIG. 8.

Referring to FIG. 9, the cyclic referencing management unit 83 includes a cyclic referencing capable asset detection unit 91, an ID insertion unit 92, an ID comparison unit 93, an ID deletion unit 94, and an ID storage unit 95.

The cyclic referencing capable asset detection unit 91 detects assets that can generate cyclic referencing in the MPV file, that is, <mpv:Par> or <mpv:Seq>. The cyclic referencing capable asset detection unit 91 can be disposed outside the cyclic referencing management unit 83 to transmit a signal indicating that a cyclic referencing capable asset is detected, to the cyclic referencing management unit 83.

When <mpv:Par> or <mpv:Seq> is detected, for ID insertion, the ID insertion unit 92 stores the ID of <mpv:Par> or <mpv:Seq>, that is, mpv:id, into ID storage unit (RefIDSet) 95.

The ID comparison unit 93 compares the ID of an asset referred to by the child asset of <mpv:Par> asset or <mpv:Seq> asset, with the ID stored in the ID storage unit 95. When the comparison result indicates that the IDs are identical, the ID comparison unit transmits a signal indicating that cyclic referencing occurs, to the cyclic referencing processing unit 96. When there are no more child assets to be parsed after all child assets contained in <mpv:Par> or <mpv:Seq> are parsed, the ID deletion unit 94 deletes all IDs stored in the ID storage unit 95 to prepare for the next cyclic referencing management.

When a signal indicating that cyclic referencing occurs is received from the ID comparison unit 93, the cyclic referencing processing unit 96 performs processing to ignore an asset generating the cyclic referencing. The processing to ignore the asset is, for example, generating reproduction control information to prevent the asset generating the cyclic referencing from being reproduced.

The ID storage unit (RefIDSet) 95 stores mpv:id that is the ID of <mpv:Par> asset or <mpv:Seq> asset contained in the MPV filed being parsed.

Figure 10:
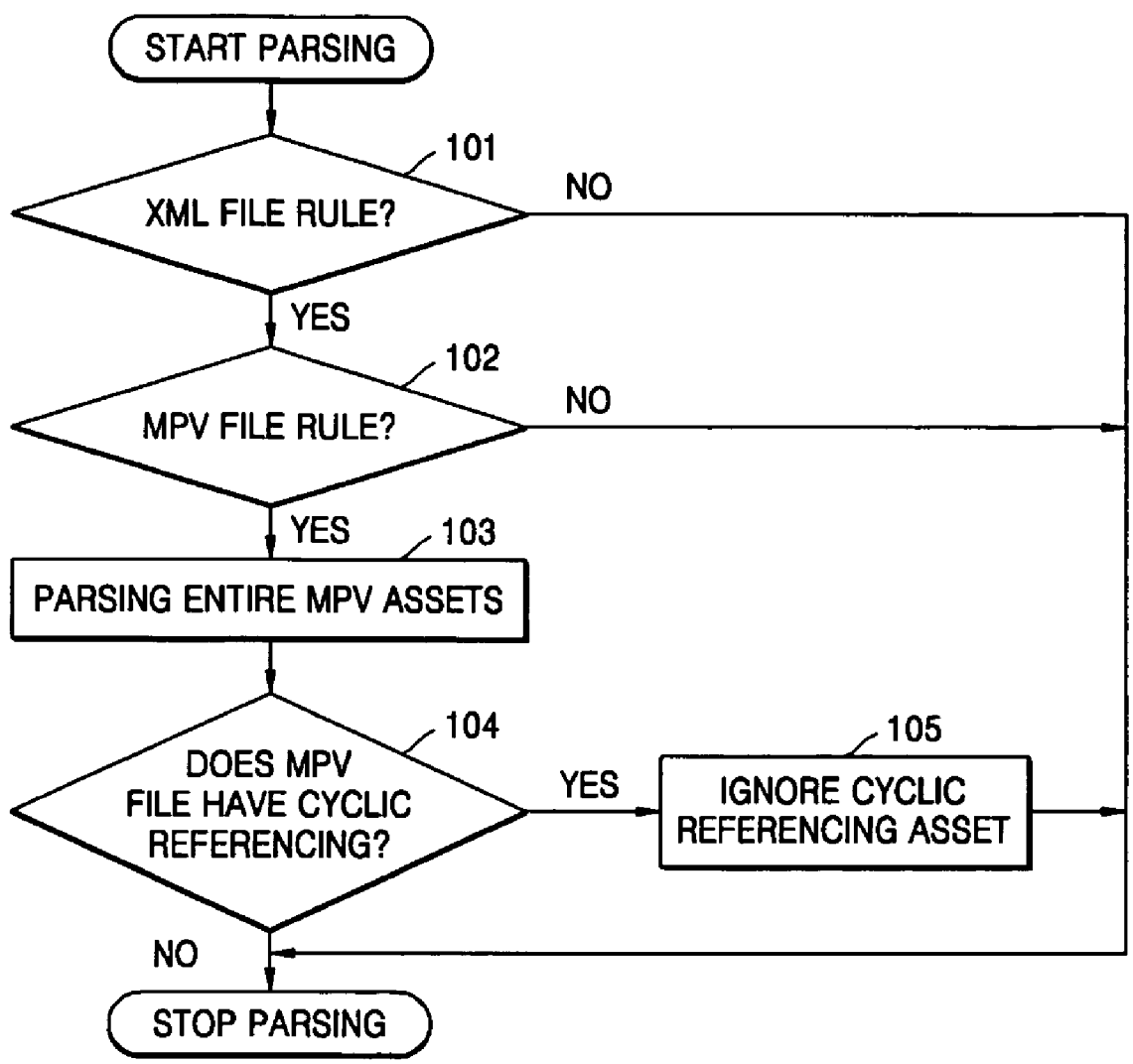
FIG. 10 is a flowchart of the steps performed by a method to solve cyclic referencing according to the present invention.

FIG. 10 is a flowchart of the steps performed by a method to solve cyclic referencing according to the present invention.

Referring to FIG. 10, first, the MPV parser 82 determines whether or not an MPV file to be parsed complies with an XML file rule in operation 101. If the MPV file to be parsed does not comply with the XML file rule, the MPV parser 82 finishes parsing.

Next, the MPV parser 82 determines whether or not the MPV file to be parsed complies with an MPV file rule in operation 102. If the MPV file to be parsed does not comply with the MPV file rule, the MPV parser 82 finishes parsing.

When the MPV file to be parsed complies with both the XML file rule and MPV file rule, the MPV parser 82 parses the entire MPV asset in operation 103.

When the MPV file is parsed, the cyclic referencing management unit 83, in particular, determines whether or not the MPV file has cyclic referencing in operation 104. If the MPV file does not have cyclic referencing, the parsing is finished.

When the MPV file has cyclic referencing, the cyclic referencing management unit 83 performs processing to ignore the asset generating the cyclic referencing in operation 105, and finishes parsing.

Figure 11:
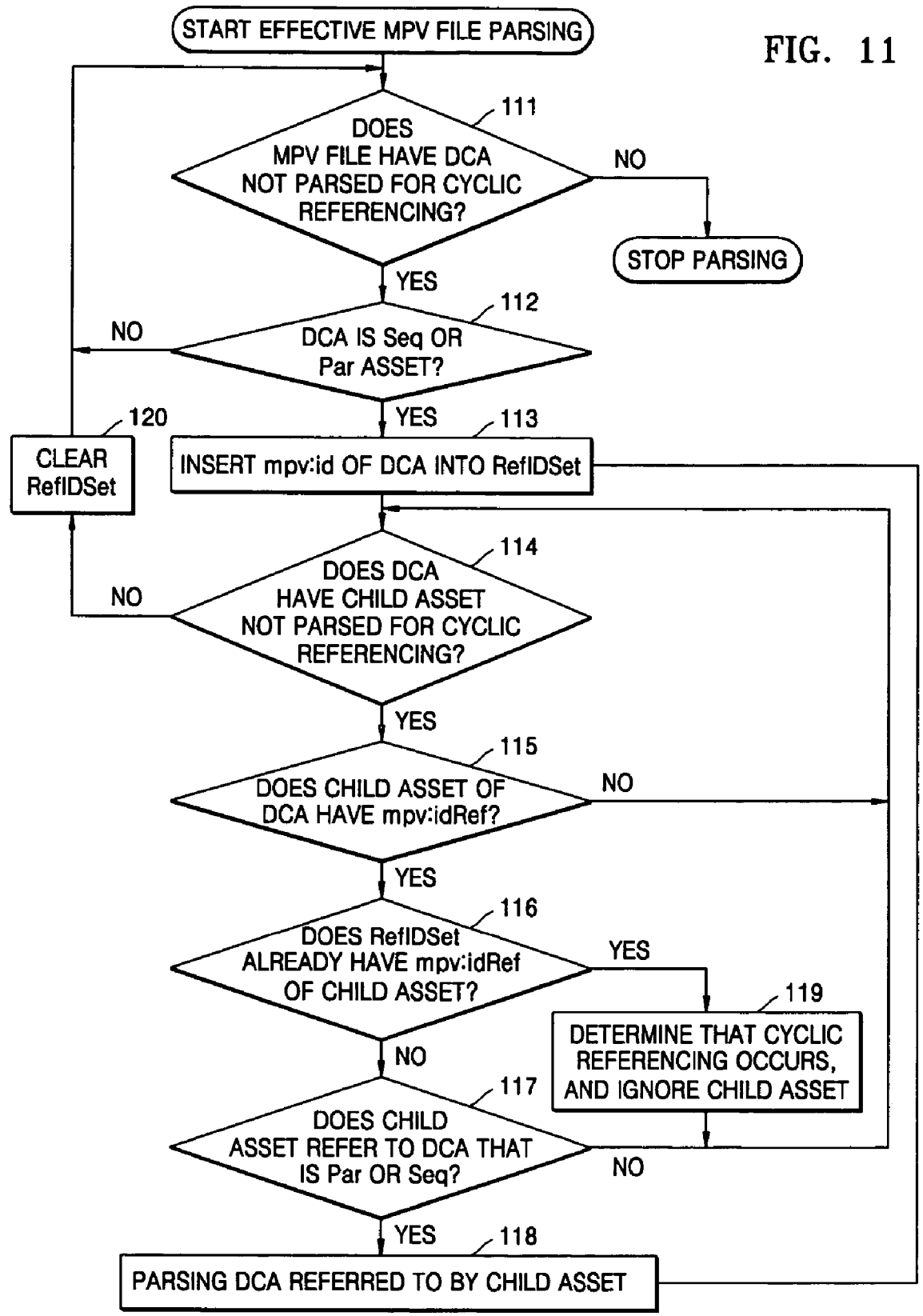
FIG. 11 is a detailed flowchart of the method to solve cyclic referencing shown in FIG. 10.

FIG. 11 is a detailed flowchart of the method to solve cyclic referencing shown in FIG. 10.

Referring to FIG. 11, first, the cyclic referencing capable asset detection unit 91 determines whether or not there is a direct child asset of AssetList (DCA) not parsed in operation 111. If the determination result indicates that there is not DCA, it means that all parsing is performed, and the parsing is finished.

If there is a DCA not parsed, the cyclic referencing capable asset detection unit 91 determines whether or not the DCA is <mpv:Seq> asset or <mpv:Par> asset in operation 112. If the determination result indicates that the DCA is neither <mpv:Seq> nor <mpv:Par>, there is no possibility of occurrence of cyclic referencing, and accordingly, the operation 111 is performed to parse a next asset.

When the DCA is <mpv:Seq> or <mpv:Par>, the ID insertion unit stores mpv:id that is the ID of the DCA in RefIDSet in operation 113.

Next, the cyclic referencing capable asset detection unit 91 determines whether or not there is a child asset in which the DCA is not parsed in operation 114.

If the determination result indicates that there is no child asset in which the DCA is not parsed, there is no possibility of occurrence of cyclic referencing from the DCA, and accordingly, the operation 111 is performed to parse a next asset.

However, if there is a child asset in which the DCA is not parsed, it is determined whether or not the child asset refers to another asset in operation 115. That is, it is determined whether or not the child asset has mpv:idRef. If the determination result indicates that it is not an asset referring to another asset, there is no possibility of occurrence of cyclic referencing, and accordingly the operation 114 is performed to parse a next child asset.

If the child asset refers to another asset, that is, if the child asset has pv:idref, the ID comparison unit 93 determines whether or not RefIDSet has mpv:idRef of this child asset in operation 116. In other words, it is determined whether or not an ID identical to mpv:idRef of the child asset being currently parsed is stored in the RefIDSet.

If the determination result indicates that an ID identical to mpv:idref of the child asset being currently parsed is stored in the RefIDSet, the ID comparison unit 93 determines that cyclic referencing occurs, and ignores the child asset generating the cyclic referencing in operation 119. In order to perform the operation 119, the cyclic referencing processing unit 96 may generate reproduction control information to prevent the child asset generating the cyclic referencing from being reproduced, and provide the information to the MPV parser 82. Then, the operation 114 is performed to parse a next child asset.

If the determination result indicates that the ID is not stored in the RefIDSet, the cyclic referencing capable asset detection unit 91 determines whether or not the child asset to be parsed currently refers to a DCA that is <mpv:Seq> or <mpv:Par> in operation 117. If the determination result indicates that this child asset does not refer to <mpv:Seq> or <mpv:Par>, the operation 114 is performed to parse a next child asset.

If the determination result indicates that this child asset refers to <mpv:Seq> or <mpv:Par>, parsing the DCA referred to by this child asset is started in operation 118, and the operation 113 is performed to store mpv:id that is the ID of the DCA referred to by this child asset, in RefIDSet.

If it is determined in the operation 114 that the DCA does not have a child asset not parsed, the ID deletion unit 94 clears RefIDSet in operation 120.

The cyclic referencing solving method according to the present embodiment will now be explained with an example of an MPV file in which actual cyclic referencing occurs as shown in FIG. 6A.

Figure 12A:
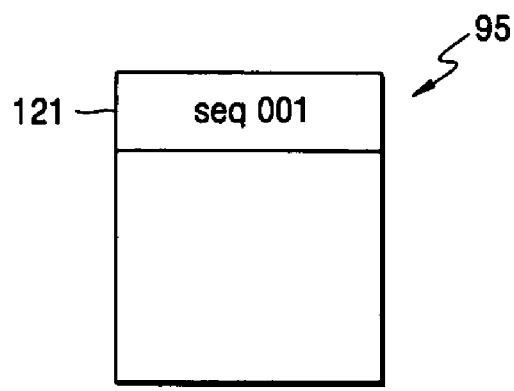
FIGS. 12A through 12C are reference diagrams explaining an identification (ID) to be stored in an ID storage unit when an MPV file shown in FIG. 6A is parsed.

First, since the type of the first child asset 61 is <mpv:Seq> and the ID of the first child asset 61 is "seq001", "seq001" 121 is stored in the ID storage unit 95 as shown in FIG. 12A in operation 113.

Figure 12B:
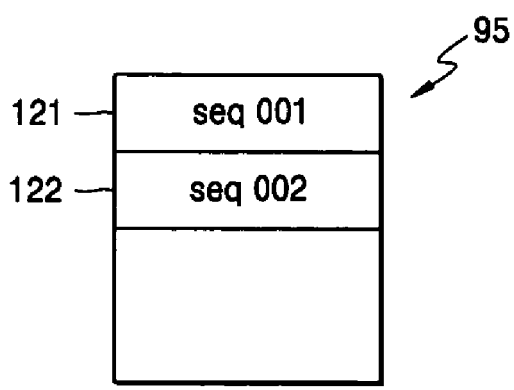

Next, the child asset of the first child asset 61 is detected. Since this child asset has <mpv:idRef>, it is determined whether or not this mpv:idRef "seq002" is an ID stored in the ID storage unit 95 shown in FIG. 12A in operation 116. Since the ID storage 95 does not have "seq002", the next operation 117 is performed. Since this child asset refers to DCA that is <mpv:Seq>, the operation 118 is performed to start parsing the DCA referred to by this child asset, and the operation 113 is performed to store the DCA referred to by this child asset, that is, "seq002", in the ID storage unit 95 in operation 113. Thus, seq001 121 and seq002 122 are stored in the ID storage unit 95 as shown in FIG. 12B.

Figure 12C:
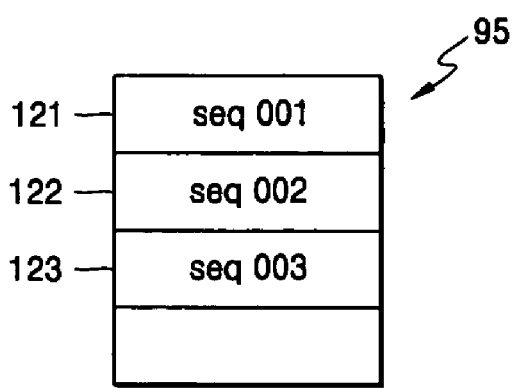

Next, the child asset of this second child asset 62 is detected. Since this child asset has mpv:idRef, it is determined whether or not this mpv:idRef "seq003" is an ID stored in the ID storage unit 95 in operation 116. Since the ID storage 95 does not have "seq003", the next operation 117 is performed. Since this child asset refers to DCA that is <mpv:Seq> in the operation 117, the operation 118 is performed to start parsing the DCA referred to by this child asset, and the operation 113 is performed to store the DCA referred to by this child asset, that is, "seq003", in the ID storage unit 95 in operation 113. Thus, seq001 121, seq002 122, and seq003 123 are stored in the ID storage unit 95 as shown in FIG. 12C.

Next, the child asset of this third child asset 63 is detected. Since this child asset has mpv:idRef, it is determined whether or not this mpv:idRef "seq001" is an ID stored in the ID storage unit 95 in operation 116. Since the ID storage 95 stores "seq001", it can be found that cyclic referencing occurs, and the operation 119 is performed to ignore this child asset. That is, <mpv:SeqRef mpv:idRef="seq001"> that is the child asset of the third child asset 63 is ignored. In the example of the MPV file shown in FIG. 6A, all the child assets of the AssetList and their child assets are formed with only <mpv:Seq> and <mpv:SeqRef> in order to show cyclic referencing, and accordingly, it is difficult to apply this example to actual reproduction. However, if there is another child asset in front of <mpv:SeqRef mpv:idRef="seq001"> that is the child asset of the third child asset 63, reproduction can be performed to the former child asset and the reproduction of <mpv:SeqRef mpv:idRef="seq001"> can be prohibited.

Then, the operation 114 is performed and since there is no child asset to be parsed any more, the operation 120 is performed to clear the ID storage unit.

Though applying the cyclic referencing management method according to the present invention mainly to the MPV file and the apparatus parsing the MPV file is explained in the above embodiments, application of the cyclic referencing management according to the present invention is not limited to this MPV and can include any applications generating and using a playlist for asset control, which will be easily understood by a person skilled in the art of the present invention.

The cyclic referencing management method as described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, cyclic referencing that can occur in an MPV file can be detected and processed such that the system can be prevented from entering an indefinite loop or causing an erroneous operation.

What is claimed is:

1. A cyclic referencing management method for managing cyclic referencing occurring by mutual references of assets in a file provided to control assets in a multimedia application environment, the method comprising:
   reading out the file from a storage medium;
   parsing the assets recorded in the file; and
   reproducing content in the storage medium based on a result of the parsing,
   wherein the parsing comprises:
      detecting an asset generating cyclic referencing; and
      ignoring the asset generating cycling referencing.

2. The method of claim 1, wherein the asset generating the cyclic referencing includes <mpv:Seq> or <mpv:Par>.

3. A cyclic referencing management method for managing cyclic referencing occurring by mutual references of assets in a file provided to control assets in a multimedia application environment, the method comprising:
   reading out the file from a storage medium;
   parsing the assets recorded in the file; and
   reproducing content in the storage medium based on a result of the parsing,
   wherein the parsing comprises:
      detecting an asset capable of generating cyclic referencing;
      detecting a child asset referring to the detected asset, among child assets of the detected asset; and
      ignoring the detected child asset.

4. The method of claim 3, wherein the asset capable of generating the cyclic referencing includes <mpv:Seq> or <mpv:Par>.

5. The method of claim 4, wherein detecting the child asset referring to the detected asset, among child assets of the detected asset comprises:
   comparing mpv:id that is the identifier of the detected asset, with mpv:idRef that is a reference identifier of the child asset referring to another asset, among the child assets of the asset; and
   detecting a child asset having mpv:idRef identical to the mpv:id.

6. The method of claim 3, wherein ignoring the detected child asset comprises:
   generating control information to prohibit reproduction of the detected child asset.

7. A parsing method for receiving a file provided to control assets, parsing the file and outputting the parsing result in a multimedia application environment, the method comprising:
   parsing the entire assets contained in the file which complies with an extensible markup language (XML) file rule and a MusicPhotoVideo (MPV) file rule;
   detecting an asset generating cyclic referencing while parsing the asset; and
   ignoring the asset generating the cyclic referencing.

8. The parsing method of claim 7, wherein ignoring the asset comprises:
   generating reproduction control information to prohibit reproduction of the asset generating the cyclic referencing.

9. A cyclic referencing management physical apparatus for managing cyclic referencing occurring by mutual references of assets in a file provided to control assets in a multimedia application environment, the apparatus comprising:
   a parser which reads out the file from a storage medium, and parses assets recorded in the file; and
   a reproduction control unit which controls such that content stored in the storage medium can be reproduced based on the result of parsing, wherein the parser comprises a cyclic referencing management unit which detects an asset generating cyclic referencing and ignores the asset generating cycling referencing.

10. The apparatus of claim 9, wherein the asset generating the cyclic referencing includes <mpv:Seq> or <mpv:Par>.

11. A cyclic referencing management physical apparatus for managing cyclic referencing occurring by mutual references of assets in a file provided to control assets in a multimedia application environment, the apparatus comprising:
　a parser which reads out the file from a storage medium, and parses assets recorded in the file; and
　a reproduction control unit which controls such that content stored in the storage medium can be reproduced based on the result of parsing,
　wherein the parser comprises:
　a detection unit which detects an asset capable of generating cyclic referencing;
　an identifier storage unit which stores the identifier of the detected asset;
　an identifier comparison unit which detects a child asset referring to the asset having the stored identifier, among child assets of the detected asset; and
　a cyclic referencing processing unit which ignores the detected child asset.

12. The apparatus of claim 11, wherein the asset capable of generating the cyclic referencing includes <mpv:Seq> or <mpv:Par>.

13. The apparatus of claim 12, wherein the identifier comparison unit compares mpv:id that is the stored identifier of the detected asset, with mpv:idRef that is a reference identifier of the child asset referring to another asset, among the child assets of the asset, and detects a child asset having mpv:idRef identical to the mpv:id.

14. The apparatus of claim 11, wherein the cyclic referencing processing unit generates control information to prohibit reproduction of the detected child asset.

15. A physical parsing apparatus for receiving a file provided to control assets, parsing the file and outputting the parsing result in a multimedia application environment, the apparatus comprising:
　a cyclic referencing management unit which detects an asset generating cyclic referencing while parsing an asset contained in an MPV file complying with an XML file rule and an MPV file rule, and ignores the asset generating the cyclic referencing.

16. The parsing apparatus of claim 15, wherein the cyclic referencing management unit generates reproduction control information to prohibit reproduction of the asset generating the cyclic referencing, and transmits the generated reproduction control information to an apparatus for controlling reproduction of the asset contained in the MPV file.

17. A computer readable storage medium having embodied thereon a computer program for a cyclic referencing management method for managing cyclic referencing occurring by mutual references of assets in a file provided to control assets in a multimedia application environment, wherein the method comprises:
　reading out the file from a storage medium;
　parsing the assets recorded in the file; and
　reproducing content in the storage medium based on a result of the parsing,
　wherein the parsing comprises:
　detecting an asset generating cyclic referencing; and
　ignoring the asset generating cycling referencing.

18. A computer readable storage medium having embodied thereon a computer program for a cyclic referencing management method for managing cyclic referencing occurring by mutual references of assets in a file provided to control assets in a multimedia application environment, wherein the method comprises:
　reading out the file from a storage medium;
　parsing the assets recorded in the file; and
　reproducing content in the storage medium based on a result of the parsing,
　wherein the parsing comprises:
　detecting an asset capable of generating cyclic referencing;
　storing the identifier of the detected asset;
　detecting a child asset referring to the asset having the stored identifier, among child assets of the detected asset; and
　ignoring the detected child asset.

19. A computer readable storage medium having embodied thereon a computer program for a parsing method for receiving a file provided to control assets, parsing the file and outputting the parsing result in a multimedia application environment, wherein the method comprises:
　determining whether or not the file complies with an extensible markup language (XML) file rule and a MusicPhotoVideo (MPV) file rule;
　parsing the entire assets contained in the file if the file complies with the XML file rule and MPV file rule;
　detecting an asset generating cyclic referencing while parsing the asset; and
　ignoring the asset generating the cyclic referencing.

* * * * *